United States Patent
Leyrer

(10) Patent No.: US 6,948,013 B2
(45) Date of Patent: Sep. 20, 2005

(54) APPARATUS AND METHOD FOR CONFIGURING DATA CELLS

(75) Inventor: Thomas Leyrer, Geisenhausen (DE)

(73) Assignee: Texas Instruments Deutschland, G.m.b.H., Freising (DE)

( * ) Notice: Subject to any disclaimer, the term of this patent is extended or adjusted under 35 U.S.C. 154(b) by 106 days.

(21) Appl. No.: 10/658,714

(22) Filed: Sep. 9, 2003

(65) Prior Publication Data

US 2004/0095814 A1 May 20, 2004

(30) Foreign Application Priority Data

Sep. 9, 2002 (DE) .......................................... 102 41 718

(51) Int. Cl.$^7$ ............................................... G06F 3/00
(52) U.S. Cl. .......................... 710/52; 710/30; 370/235; 370/266; 370/464; 370/474
(58) Field of Search ..................... 710/30, 52; 370/235, 370/266, 464, 474

(56) References Cited

U.S. PATENT DOCUMENTS

| | | | | |
|---|---|---|---|---|
| 6,449,254 B1 | * | 9/2002 | Hadjiahmad | ................ 370/235 |
| 6,526,053 B1 | * | 2/2003 | Ishiba et al. | ................ 370/389 |
| 2003/0085902 A1 | * | 5/2003 | Vogelaar et al. | ............ 345/505 |

FOREIGN PATENT DOCUMENTS

DE 195 14 043 A1 10/1996

OTHER PUBLICATIONS

"Designing ADSL in an ATM Network," Electronics Engineer, Nov. 1999, (Yiu, Henry) p. 1, col. 2, voice, video: Fig. 4, TC Sublayer; p. 3, col. 2; Fig. 3 and page 1, col. 2, 2$^{nd}$ paragraph).

ATM—Die Technik (ATM Technology), Huthing Publishers, Heidelberg, Germany, 3$^{rd}$ edition, 1997, Cover sheet and pp. 86, 129–132, (Siegmund, Gerd) (p. 130, ill. 2.47 cited as an example of user data parts of the data cells belonging together being assembled into a frame; p. 86 cited for information about empty cell stored in the header in a standarized manner for a ATM idle cells).

* cited by examiner

Primary Examiner—Jeffrey Gaffin
Assistant Examiner—Justin Knapp
(74) Attorney, Agent, or Firm—Frederick J. Telecky, Jr.; W. James Brady; Warren L. Franz

(57) ABSTRACT

An apparatus is provided for configuring data cells received in a telecommunications process in a continuous stream of data cells of fixed length and each comprising a header and a user data part. The apparatus comprises a processing unit, adapted and configured so that it is able to check data cells for the presence of empty cells, discard the data cells consisting of empty cells and then check the user data parts of the data cells less the empty cells—without the need to buffer the same—as to whether they belong together, and then to assemble the user data parts of the data cells belonging together into a frame. The apparatus may be integrated in, a modem and is also particularly suitable for data cells existing as ATM cells for receiving by an ATM system. The invention relates in addition to a correspondingly sequencing method for configuring data cells.

24 Claims, 3 Drawing Sheets

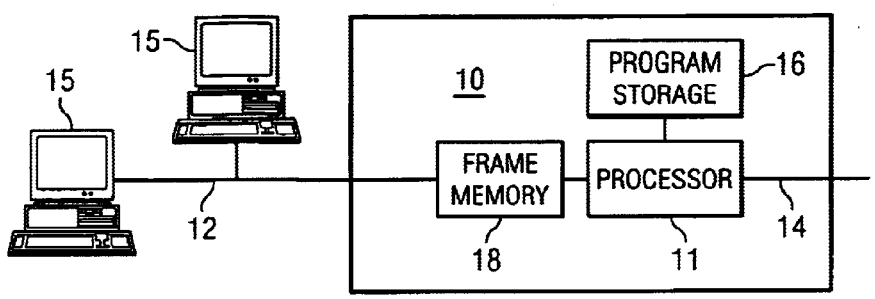
FIG. 1
FIG. 2
| BYTE 1 | GFC (3:0) | VPI (7:4) | ATM HEADER PART |
| BYTE 2 | VPI (3:0) | VCI (15:12) | |
| BYTE 3 | VCI (11:4) | | |
| BYTE 4 | VCI (3:0) | PTI (2:0) | CLP | |
| BYTE 5 | HEC (7:0) | | |
| BYTE 6 | USER DATA (7:0) | | USER DATA PART |
| | ⋮ | | |
| BYTE 53 | USER DATA (383:375) | | |
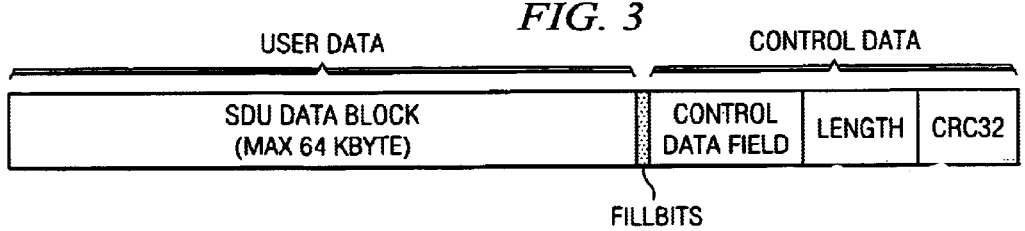
FIG. 3

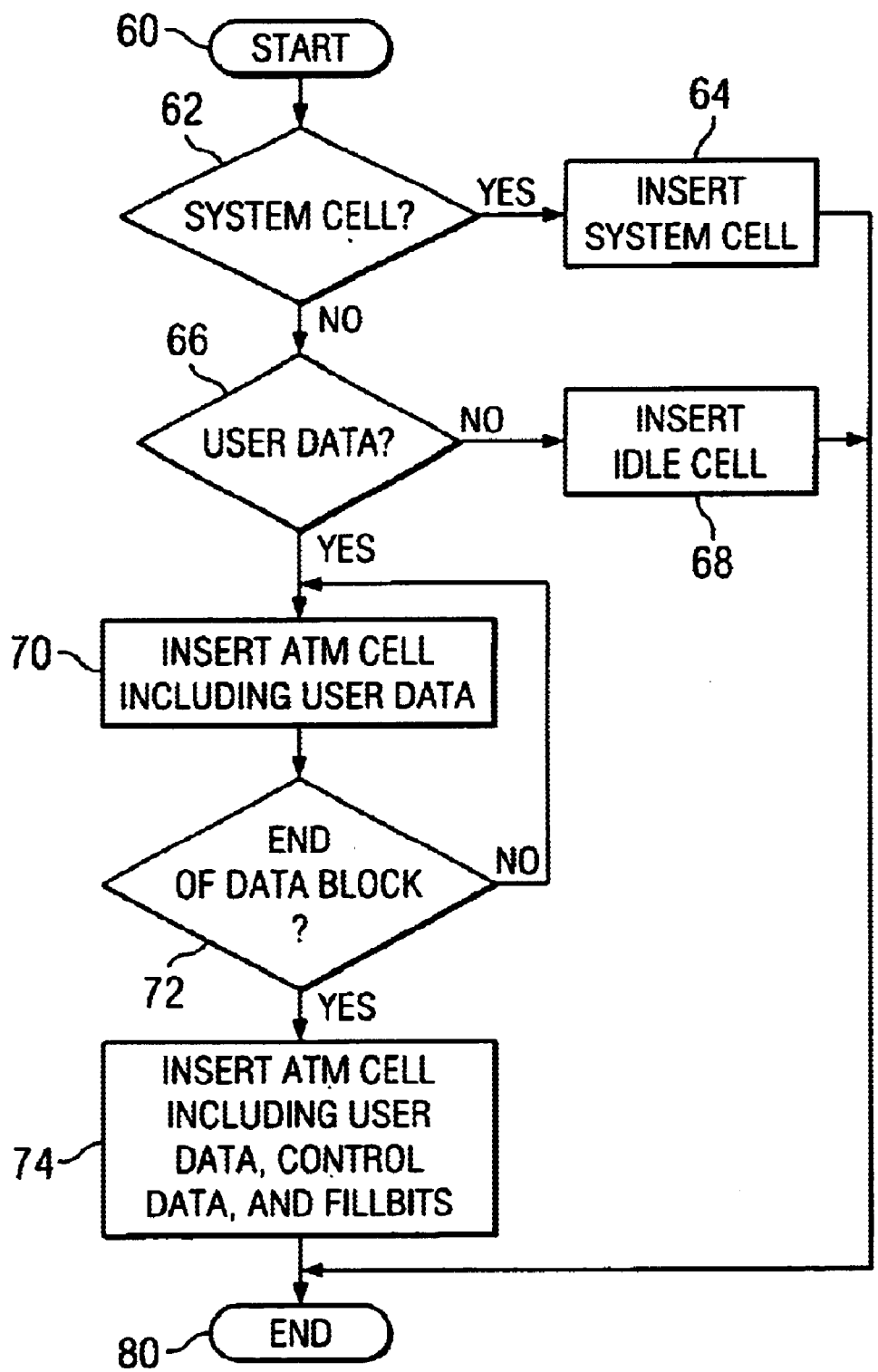

APPARATUS AND METHOD FOR CONFIGURING DATA CELLS

CROSS REFERENCE TO RELATED APPLICATIONS

This application claims priority under 35 U.S.C. 119 of German Patent Application Number 10241718.0 filed Sep. 9, 2002.

FIELD OF THE INVENTION

The invention relates to an apparatus and a method for configuring data cells received in a telecommunications process in a continuous stream of data cells of fixed length and each comprising a header and a user data part.

BACKGROUND OF THE INVENTION

The wide-spread popularity of the Internet in both private and commercial applications has resulted in a sudden increase in the requirement for broadband data connections, the majority of which can be produced over an already existing cable so that furnishing the data line does not add to the costs involved. This technique is used by some telecommunications vendors in public networks of high bandwidth. Transmitting the user data part is done, for example, via the POTS line often already existing at the customer end. In this arrangement the user data can be transmitted in parallel to the so-called narrow-band services, e.g. digital or analog voice or fax communications.

For fast bidirectional data transmission, use is made, for example, of the asymmetrical digital subscriber line (ADSL) technology in which a modulated analog signal is transmitted via the copper pair of the POTS line. A demodulator circuit as may be a component of an ADSL modem of the customer converts the modulated analog signal into a stream of serial synchronized bits. Synchronizing the serial bit stream satisfactorily makes it necessary that the serial bit stream be permanently available. This is why, should no user data be transmitted at the time, empty data packets (so-called empty cells) are transmitted in a predefined format so that a continual data stream exists in the transmitting and receiving direction.

In achieving broadband public networks, asynchronous transfer mode (ATM) systems as standardized by the International Telecommunication Union (ITU) are finding increasing application for communicating data between subscribers. In this communication technology, the user data to be transmitted in a format in accordance with a network protocol of the local area network (LAN) is resolved into one or more ATM data cells of a fixed byte length, provided with a destination address and transmitted via packet switching exchanges to the destination address. The ATM data cells need to be converted back at the receiver end into user data in a data format in accordance with the network protocol.

In network terminology, the various protocol steps are usually termed "layers." Involved in the case of ATM data communications as cited above are the so-called transmission convergence (TC) layer and the ATM adaption layer (AAL).

The TC layer represents a processing step controlling communication of the user data via the physical connection of the public network. In this processing step, the user data in the form of ATM cells is received as a serial data stream, checked for transmission errors, and empty cells serving to maintain synchronization are removed. When user data is transmitted, this processing step computes a checksum to be added to the ATM cells to be transmitted. If no user data needs to be transmitted, empty cells are transmitted in the direction of communication.

The AAL in ATM systems is the member linking cell-oriented transmission of the TC layer to the user data to be forwarded to a higher protocol layer. In ATM technology, various modes of communication are supported for the various applications, each of which is assigned a service type and its own data format of the interface of the AAL to a higher protocol layer. Provided for data transmission with the aid of a modem is the so-called AAL5 service type specially introduced for this application as part of the ATM specification.

The AAL handles substantially two tasks. For one thing, it provides an interface to the local area network (LAN); for another, ATM cells to be exchanged with the TC layer need to be converted into a suitable data format. This function is handled by the segmentation and reassembly (SAR) function.

Processing the functions of the TC layer and SAR function of the AAL is usually handled by a special apparatus as may be integrated in an ADSL modem, for example. It is in this apparatus that the received ATM data cells are configured and made available in a format compatible with the network protocol used (for example TCP/IP) for feeding into a LAN connecting the hardware of the net subscriber, e.g., a PC.

In previously known apparatus of the aforementioned kind, the processing functions of the TC layer and the SAR function of the ATM adaptation layer (AAL) are each implemented in two separate processing units. The two processing units may be achieved in the form of one or more processors in which various programs are handled. Since processing the data in two processing units is done with differing processing times or program priorities, a buffer storage, (e.g., a FIFO) needs to be inserted between the two processing units to hold the data until it is able to be processed by the other processing unit in each case. For reading the data in and out of the buffer storage, a separate interface to the two processing units is needed in each case. This makes the configuration of such apparatus complicated and expensive.

SUMMARY OF THE INVENTION

It is an object of the invention to provide an apparatus of the aforementioned kind which has a simple and inexpensive configuration as compared to existing apparatus. In addition, it is an object of the invention to provide a corresponding particularly simple method.

In accordance with one aspect of the invention, an apparatus is provided that comprises a processing unit, configured so that it is able to check data cells for the presence of empty cells, discard the data cells consisting of empty cells, then to check the user data parts of the data cells less the empty cells—without needing to buffer same—to determine whether they belong together, and then to assemble the user data parts of the data cells that belong together into a frame.

The invention provides a novel way for advantageously configuring data cells wherein user data parts of data cells belonging together of a lower protocol layer are assembled into frames in a single processing unit without buffering, resulting in a buffer storage no longer being needed for the ATM cells less the empty cells while likewise doing away with the interface between various processing units. In addition, empty data cells and data cells not intended for this apparatus are discarded. The processing unit can be configured in a simpler way because irrelevant data cells are discarded at an early stage so that the processing unit now needs to handle substantially fewer data cells.

In another aspect of the invention, a method is provided that comprises checking the data cells for the existence of empty cells, discarding data cells consisting of empty cells, checking—without buffering—the data cells less the empty cells to determine whether they belong together, and assembling the user data parts of the data cells belonging together into a frame.

BRIEF DESCRIPTION OF THE DRAWINGS

Embodiments of the invention are discussed by way of example with reference to the accompanying drawings, in which:

FIG. 1 is a schematic block diagram of one embodiment of an apparatus in accordance with the invention;

FIG. 2 is an illustration of a configuration of a data cell as configured by an apparatus in accordance with the invention;

FIG. 3 is an illustration of a data unit including a frame comprising data cells as assembled by an apparatus in accordance with the invention;

FIG. 5 is a flow chart of another embodiment of a method in accordance with the invention.

DETAILED DESCRIPTION OF THE INVENTION

Figure 4:
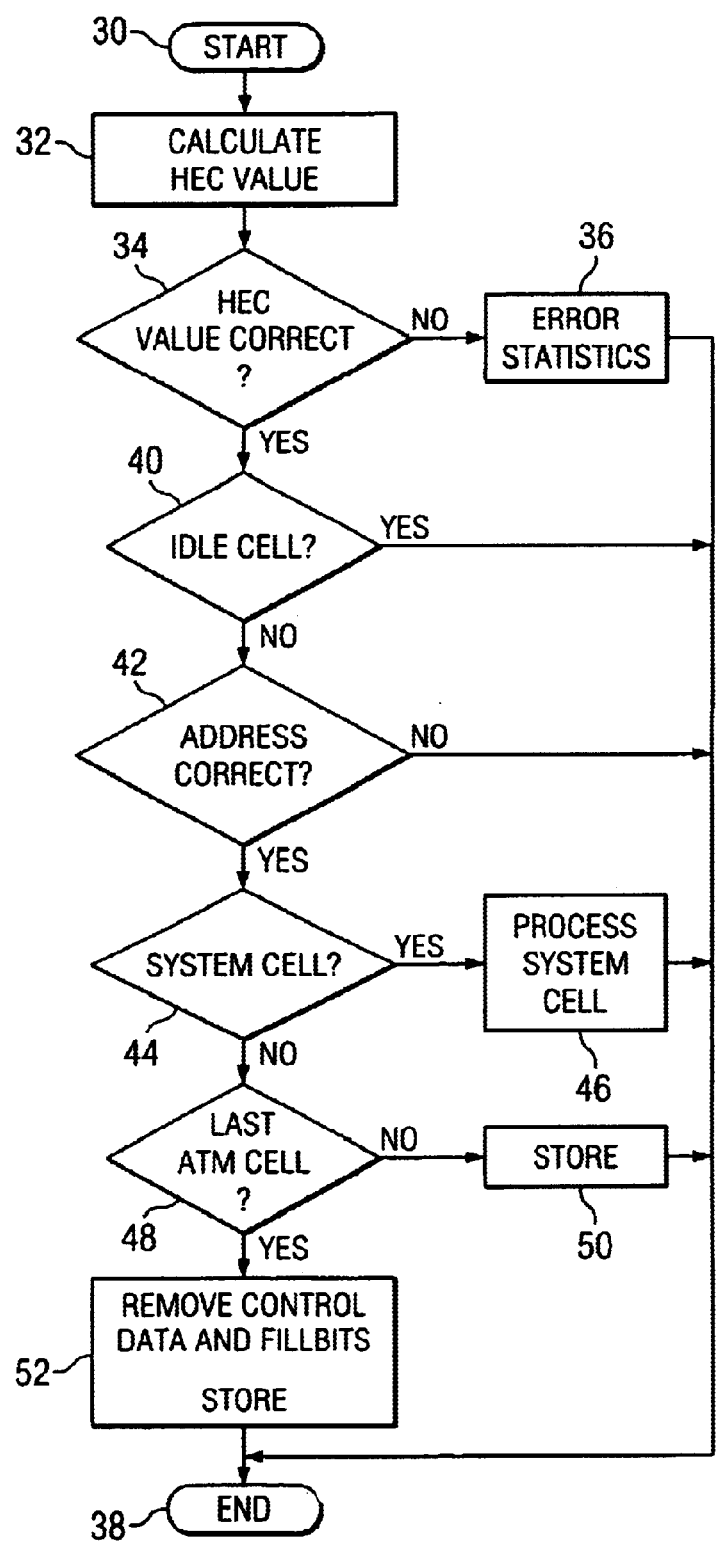
FIG. 4 is a flow chart of one embodiment of a method in accordance with the invention.

FIG. 1 illustrates a first embodiment of an apparatus 10 in accordance with the invention for configuring data cells received as a continuous stream of data cells in a data transfer mode; the data transfer mode in this case being an asynchronous transfer mode (ATM). The apparatus 10 may be integrated for example in a modem. The apparatus 10 is connected to a local area network (LAN) 12 as well as to a broadband public network 14 and links the LAN 12 to the public network 14.

The apparatus 10 comprises a processing unit 11 which may consist of one or more processors and a program storage 16 connected to the processing unit 11 for storing instructions configured so that they represent the steps of the embodiments of the methods in accordance with the invention such as described below.

The LAN 12 may comprise one or more computers 15 which, in making use of the network protocol, permit swapping data with the apparatus 10 in accordance with the invention.

The modem comprising the apparatus 10 is connected, for example, by a flex pair of copper conductors of a POTS connection to the public network 14 in accordance with ADSL technology, the data being communicated in the form of a stream of serial bits.

The processing unit 11 configures data cells received from the public network 14 so that the data cells are converted into frames configured so that they can be processed at a higher protocol layer. These frames can be communicated via a frame memory 18 connected to the apparatus 10 to the computers 15 which in this way are able to receive data stemming, for example, from a web server via the public network 14.

In the case as described in the following, the data cells are communicated in the public network 14 in the form of ATM cells in a continuous stream to the apparatus 10 and the frame of the higher protocol layer represents an AAL5 data unit as an interface to the LAN 12. The apparatus in accordance with the invention and the method in accordance with the invention can easily be modified, however, so that they are just as applicable for other data cell and frame formats specified differently from the present case as described.

FIG. 2 illustrates the configuration of an ATM cell having a fixed length of 53 bytes. The first five bytes form the ATM header and are used as control information, i.e., the actual user data is held in the subsequent 48 bytes.

The data fields identifying the virtual paths (VPI) and virtual channels (VCI) of the ATM header comprise one or two bytes and form together the destination address as dedicated to each receiver which may, for example, comprise a modem. In ATM, it is the destination address which controls communication of the individual ATM cells by means of the so-called virtual paths and virtual channels.

The payload type identifier (PTI) bit field of the ATM header consists of 3 bits and is used to distinguish ATM cells containing user data from cells containing system data. In addition, the PTI bit field marks by a predefined bit combination the last ATM cell belonging to a frame.

The header error control (HEC) field contains an 8-bit checksum defined by means of an error correction function from the first 4 bytes of the header. This so-called HEC value serves to identify headers including communication errors. It is also used for data cell synchronization, to permit ATM cell delineation in the continuous stream of serial bits.

The generic flow control (GFC) bit field comprising 3 bits and the cell loss priority (CLP) control bit are shown for the sake of completeness, but are not important to the understanding of the apparatus and method of the invention.

FIG. 3 illustrates the data format of the AAL5 data unit. Several data cells containing exclusively the user data part of the ATM cells are assembled into a frame, called the service data unit (SDU) frame in FIG. 3. This SDU frame is then memorized for later communication to the next-highest protocol step for further processing.

Likewise illustrated in FIG. 3 in the AAL5 data unit for ATM communication are further items of control information comprising a two-byte long control data field, of the same length as the SDU frame contained in the two-byte long LENGTH data format, and a four-byte long checksum computed from the value of the SDU frame and held in the CRC32 data field. In addition, filler bits are provided whose function is explained below. Since the control data field is not important for understanding the apparatus in accordance with the invention, no further details thereof are included.

FIG. 4 illustrates the steps in a program stored in the program storage unit 10 of the processor(s) 11 of the apparatus 10 for receiving a continuous stream of ATM cells from the public network 14.

The flow chart of FIG. 4 representing the steps in one embodiment of the method in accordance with the invention as recycled every time at the starting point of the program 30 for each ATM cell received by the apparatus 10 via the public network 14.

Before configuration of the ATM cells can commence, the stream of serial bits received needs to be synchronized for ATM cell delineation. For this purpose four bytes each of the stream of serial bits received are used to form a checksum with the aid of the same error correction function used for computing the HEC value of an ATM cell. This checksum is compared to the HEC value communicated in an ATM cell as the fifth byte. When the computed value tallies with the value as communicated by the fifth byte, the position of the ATM cell header and thus cell delineation is identified. ATM cell synchronization is concluded when this agreement has been detected for a predefined number of ATM cells in sequence.

In accordance with the synchronization procedure just described, the HEC checksum is computed from the four byte long ATM header in step 32 of the program (see FIG. 4). In the subsequent interrogation step 34, the check as described above is implemented to see whether the HEC value communicated in the header tallies with the value computed by way of the preceding byte. If a set number of errors in sequence is exceeded, the steps described above can be repeated for synchronizing the serial bit stream to the start of the ATM cell.

Should the HEC value not be correct, i.e. the computed value fail to tally with the HEC value taken over from the bit stream, a statistics function 36 is called which registers the faulty communication and then discontinues further processing of the ATM cell by jumping to the end of program 38. If the two HEC checksums tally, the program branches to interrogation step 40.

As previously mentioned, as in the majority of connecting techniques so too in the ATM method as described presently as an example, the stream of data cells needs to be communicated without interruptions. This is why, should no user data be communicated at the time, empty cells are transmitted in a predefined format. On interrogation 40, a check is made as to whether the ATM cell just received is an empty cell or a cell including user data or control data of a system cell as detailed below. This is done by way of the HEC checksum of the ATM cell header which assumes a predefined value characteristic of empty cells being present if an empty cell is involved, the program branches to the end 38, so that empty cells are not included in further processing.

Should the ATM cell being processed at the time not be an empty cell, the program jumps directly to interrogation step 42—in which—without prior buffering of the remaining ATM cells less the empty cells the destination address contained in the VCI and VPI data fields of the ATM header of the remaining ATM cells is checked for correctness. Should the received ATM cell not be destined for the receiver, i.e. the apparatus 10 or a modem comprising the apparatus, the destination address fails to tally with a predefined address as memorized, for example, in a configuration register of the apparatus in accordance with the invention. In this case the ATM cell is discarded and processing discontinued at end 38 of the program.

The remaining steps in the program are thus implemented solely for ATM cells having no empty cells and a valid destination address.

On interrogation 44, a check is made by analyzing the PTI bit field of the ATM header to see whether the ATM cell can be classified as a user cell or system cell. System cells—also termed network cells or operations and maintenance (OAM) cells—are used, for example, for testing data communications or to measure the response time of the receiver.

If the latest ATM cell is an OAM cell, the next step is its further processing in function block 46. Here, the desired information is made available and the modified OAM cell can be transmitted back e.g. to the sender of the ATM cell. If user cells are being communicated at the time, the processor jumps to interrogation step 48.

The data format of the AAL5 data unit provides a maximum length of 64 kbyte for the SDU frame (see FIG. 3). In this frame, which is substantially larger than the user data part of a single ATM cell shown in FIG. 2, the user data parts of several ATM cells are assembled into a larger frame, ignoring the ATM header.

On interrogation 48, a check is then made by way of the PTI bit field in the ATM cell header to see whether all ATM cells belonging to a frame have already been communicated, i.e., whether the ATM cell being checked at the time is the last cell belonging to an SDU frame. The PTI bit can exhibit one of two predefined values, one value for the case that the ATM cell is not the last, and the other value for the case that the ATM cell is the last belonging to an SDU frame. Should the PTI bit indicate that the ATM cell is not the last belonging to the SDU frame being formed at the time, in routine 50 the user data part of the ATM cell is copied into the SDU frame memory 18.

If the ATM cell being processed at the time is the last belonging to the SDU frame being formed at the time, in function 52 the additional control data of the AAL5 data unit as described above with reference to FIG. 3 and the filler bits are removed. The remaining user data part of the ATM cell is copied into the SDU frame memory 18.

This concludes configuring of an ATM cell and the program is terminated by the end of program 38. If the ATM cell happens to be the last cell in an SDU frame as just formed, this concludes formation of the SDU frame which is then made available in the frame memory 18 for further protocol layers of the communication protocol. Should the ATM cell not be the last cell in an SDU frame as just formed, the program is recommenced at step 30.

In the embodiment of the method in accordance with the invention as described above, the ATM cells belonging to an SDU frame were received one after the other and then assembled into the SDU frame. In accordance with an alternative embodiment, the ATM cells belonging to various SDU frames may also be received interleaved. Then, from the VPI/VCI bit in the ATM cell header, it is evident to which SDU frame they belong in each case. In the frame memory 18, a separate segment is then firstly allocated for each SDU frame to be commenced new, the various segments being simultaneously filled with the user data parts of the ATM cells arriving interleaved.

In addition to receiving and configuring the data cells, the apparatus 10 in accordance with the invention may also serve in a further embodiment to generate and transmit data cells as will now be briefly described.

FIG. 5 illustrates the steps in a program, in accordance with the invention, needed to transmit ATM cells to the public network 14 as may be likewise stored in the program storage 16 of the processor(s) of the apparatus.

The sequence in the part of the program for transmitting commences at point 60 in starting the program.

In the next step, a check is made on interrogation 62 as to whether a system cell as modified above (OAM cell) is to be transmitted. This has priority treatment over frames and is instantly transmitted as a complete ATM cell by means of the routine 64.

If no OAM cells exist, in the next step a check is made on interrogation 66 as to whether a frame including user data is to be transmitted. If no user data is available, the program sequence branches to block 68 in which empty cells are generated in an ATM cell format. These empty cells are then likewise transmitted by being inserted into the continually transmitted stream of data cells (jump to point 80 of the program).

If an SDU frame for communication is made available from the higher protocol layer in the frame memory 18, a program loop comprising a routine 70 and interrogation 72 is cycled until all user data of the SDU frame have been segmented into single user data fields of 48 bytes each and communicated in the form of ATM cells. The routine 70 generates and transmits the data of an ATM cell by making the header elements of the ATM cell being made available as shown in FIG. 2, the HEC value computed as described above and a 48 byte long user data field copied from the SDU frame into the user data part of the ATM cell.

On interrogation 72, a check is made on the basis of the length of the SDU frame and the number of ATM cells already transmitted to see whether segmenting a complete SDU frame into the ATM cells has been concluded. If segmenting has not been concluded, the routine 70 is retrieved, otherwise the program branches to step 74.

Since the SDU frames do not necessarily comprise a length corresponding to a whole number multiple of 48 bytes, i.e. the length of the user data (or control data) part of an ATM cell, filler bits are added to the bits for the last ATM cell belonging to a frame during step 74 in the program in addition to the remaining user data comprising the control data, the length field and the CRC32 field so as to achieve the specified length of 48 bytes. This ATM cell is then transmitted in concluding segmenting of the SDU frame to be transmitted.

The program then branches to end of program 80 which in turn instantly jumps to the start 60 in which a new ATM cell, OAM cell or empty cell is made available for data communication so that a continual stream of data cells is transmitted across the public network 14 to the receiver.

With the aid of the steps in the program as described above with reference to FIG. 4, configuring the user data part from belonging-together ATM cells into SDU frames can now be done in a single step without needing to buffer data before the SDU frames are formed. More particularly, this eliminates the need to save the ATM cells less the empty cells in a buffer, e.g., a FIFO. This likewise applies to composing ATM cells from segmenting SDU frames as described with reference to FIG. 5 without necessitating a buffer. This now enables the functions, usually implemented in the TC layer and SAR function of the AAL to be implemented in a single processing means.

The steps in the method in accordance with the invention can be implemented by a processor which serves a program held in the program storage, for example in the form of interrupt routines. By discarding empty cells and incorrectly addressed data cells without prior buffering of the data before generating the frames, the memory capacity requirement as well as the memory access frequency are considerably reduced so that a relative simple processor can now be used in thus permitting cost-effective fabrication of the apparatus in accordance with the invention.

As evident to those persons skilled in the art, the steps in accordance with the invention may also be implemented by hardware logic as may be a component of the apparatus 10 for configuring the data cells and forming their processing means.

What is claimed is:

1. An apparatus for configuring data cells received in a telecommunications process in a continuous stream of data cells of fixed length and each comprising a header and a user data part, the apparatus comprising a processing unit adapted and configured so that it is able to check data cells for the presence of empty cells, discard the data cells consisting of empty cells, then check the user data parts of the data cells less the empty cells without buffering to determine whether they belong together, and then to assemble the user data parts of the data cells belonging together into a frame.

2. The apparatus as in claim 1 wherein said processing unit comprises one or more processors.

3. The apparatus as in claim 2 further comprising a program storage unit connected to said one or more processors and containing a program to be executed by said processors.

4. The apparatus as in claim 3 further comprising a frame memory connected to said processing unit and in which said processing unit is further adapted and configured to save frames in said frame memory.

5. The apparatus as in claim 1 wherein said data cell header provides information as to whether said data cell is an empty cell, and said processing unit is additionally adapted and configured to check said data cells for empty cells by way of this information.

6. The apparatus as in claim 5 wherein said data cell header comprises information as to whether said user data part of said data cell is the last element of a frame of user data parts belonging together, and said processing unit is additionally adapted and configured to check which user data parts of said data cells in sequence belong together by way of this information.

7. The apparatus as in claim 6 wherein said data cell header comprises information as to the destination address of said data cell and said processing unit is additionally adapted and configured to check, prior to assembly of said data cells, whether said destination address is correct and discard data cells whose destination addresses are incorrect.

8. The apparatus as in claim 1 wherein said data cells are ATM cells.

9. The apparatus as in claim 8 wherein said frames are AAL5 SDUs in an ATM system.

10. The apparatus as in claim 8 wherein said processing unit is adapted and configured so that in checking for and discarding empty cells it additionally implements the functions of the TC protocol layer of an ATM system.

11. The apparatus as in claim 10 wherein the functions of said TC protocol layer also include synchronizing said ATM cells.

12. The apparatus as in claim 10 wherein said processing unit is adapted and configured so that in assembling user data parts of data cells into frames it additionally implements the functions of the SAR protocol layer of an ATM system.

13. The apparatus as in claim 1 wherein said processing unit is adapted and configured to receive and split frames so that their user data can be distributed to data cells and transmit a continuous stream of data, it then being able to insert empty cells into said data stream when no user data is present.

14. The apparatus as in claim 1 wherein said data cells belonging to a frame are received in sequence.

15. The apparatus as in claim 1 wherein said data cells belonging to a frame are received interleaved and said processing unit is additionally adapted and configured to assign said data cells to said individual frames on the basis of the destination address of said data cells.

16. A modem including an apparatus as set forth in claim 1.

17. The modem as in claim 16 wherein the modem is adapted and configured as an ADSL modem.

18. A method for configuring data cells received in a telecommunications process in a continuous stream of data cells of fixed length, each comprising a header and a user data part, the method comprising the steps of:

checking said data cells for empty cells, discarding data cells consisting of empty cells, checking said user data parts of said data cells less said empty cells, without buffering same, to identify which cells belong together, and assembling said user data parts of said data cells that belong together into a frame.

19. The method as in claim 18 further comprising storing said frames.

20. The method as in claim 18 wherein said data cell header includes information as to whether said data cell is an empty cell, and wherein checking said data cells for empty cells is done by way of this information.

21. The method as in claim 20 wherein said data cell header comprises information as to whether said user data part of said data cell is the last element of a frame of user data parts belonging together, and wherein checking which user data parts of said data cells in sequence belong together is done by way of this information.

22. The method as in claim 21 wherein said data cell header includes information as to the destination address of said data cell, and further comprises checking prior to the step of assembling said data cells to determine whether said destination address is correct, and discarding data cells whose destination address is incorrect.

23. A computer-readable medium on which instructions are stored enabling one or more processors to implement a method as set forth in claim 22.

24. A method as in claims 22 in which said frames comprise a predefined format and more particularly comprise a predefined length.

* * * * *